Patented Mar. 21, 1933

1,902,129

UNITED STATES PATENT OFFICE

PHILIP KAPLAN, OF BROOKLYN, NEW YORK, ASSIGNOR TO THE DEHYDRO COMPANY, OF TULSA, OKLAHOMA, A CORPORATION OF OKLAHOMA

MEANS FOR BREAKING WATER IN OIL EMULSIONS

No Drawing.   Application filed January 10, 1931. Serial No. 507,995.

The object of this invention is to produce a medium for breaking water in oil or oil in water emulsions and I refer particularly to the type of emulsions commonly termed cut oils, roily oils, bottoms or tank settlings or even so-called B. S. & W. or basic sludge and water mixtures.

A further object of this invention is to produce a medium that is soluble in benzine gasoline and also in water, a medium that will not freeze and will not become congealed or of objectionably greater viscosity because of cold.

The medium that I employ for accomplishing this purpose is rosin oil or rosin spirits, mixed with other emulsifying oils, preferably castor oil and may thereafter be mixed with a suitable amount of water as a carrier.

Rosin is a residue and is completely acid. It can however be dissolved in caustic acid and a soap made therefrom, but the way I prefer to operate is to take rosin spirits or rosin oil, sulphonate these rosin spirits or rosin oil and mix with another fully sulphonated oil employing about 70 to 80% of rosin oil or spirits.

I am aware that sulphonated oils have been employed for the purposes set forth, that is in breaking water in oil emulsions. The advantage of the sulphonated rosin oil or spirits is for the purpose of maintaining fluidity at low temperatures, as rosin oil upon sulphonating produces valuable sulphonic acids which when mixed with other sulphonated oils improves ordinarily used sulphonated oil by decreasing the time of operation, as these acids have a higher penetration and being miscible in both oil and water penetrates the emulsion more rapidly and causes a more complete separation thereof.

I have discovered that a very highly satisfactory product can be produced by mixing rosin oil with certain fatty oils and thereafter sulphonating the whole mixture. Let us say that the following formula is used:

Rosin oil or rosin spirits_____ 50%
Castor oil_____ 50% mixed and sulphonated and later add thereto about equal parts of water. This mixture is soluble in gasoline, benzine and water and therefore will quickly disperse itself through an oil and water emulsion, causing a separation of the emulsion and it is notable that only an exceedingly small quantity of this material is required to be employed. The exact quantity will of course be determined by the nature of the emulsion and the surface tension thereof, as tight emulsions require somewhat more of the material than do so-called loose emulsions. However, the amount required will probably range between one in two thousand parts or one in six thousand parts.

While it is desired that the oils be neutralized after sulphonation, a soap is not formed nor is the neutralization carried to such an extent that the mixture becomes alkaline or even neutral. It should have an acid reaction, not sufficient to corrode or destroy pipes, but sufficient to assure rapid penetration.

Because of their high penetration and low cold test rosin oil or rosin spirits may be added to any known treating materials, greatly to the advantage of such materials and in this regard I do not limit myself to sulphonated treating compounds or even to chemical substances that can be or are sulphonated.

It will of course be understood, as previously stated, that for special purposes or special emulsions, modifications may be made within the scope of the appended claims and it will be understood that the amount of rosin oil added to ordinary treating oils to prevent the freezing thereof will be determined by the formula of the treating oil.

I may finish the oil with a higher acid value or increase the neutralization to meet special requirements. I may increase or decrease the amount of rosin oil or rosin spirits or substitute other sulphonated oils for the castor oil described, if such is found to be desirable.

Having carefully and fully described my invention, what I claim and desire to obtain is:

1. A medium for treating petroleum emulsions wherein is combined sulphonated rosin oil.

2. A medium for breaking water in oil emulsions which consists of rosin oil sulphonated in the presence of castor oil and thereafter neutralized and washed to remove the excess of acid.

3. A medium for breaking oil in water emulsions which consists of rosin oil 50%, sulphonated in the presence of castor oil 50%, and thereafter neutralized to remove any excess of acid.

PHILIP KAPLAN.